(12) United States Patent
Heflinger et al.

(10) Patent No.: US 6,243,168 B1
(45) Date of Patent: Jun. 5, 2001

(54) DYNAMIC OPTICAL MICROMETER

(75) Inventors: Donald G. Heflinger; Lee O. Heflinger, both of Torrance, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/283,484

(22) Filed: Apr. 1, 1999

(51) Int. Cl.$^7$ .............................. G01B 9/02; G01B 11/02
(52) U.S. Cl. ............................................. 356/486; 356/484
(58) Field of Search ..................................... 356/349, 358

(56) References Cited

U.S. PATENT DOCUMENTS

| 5,493,395 | * | 2/1996 | Otsuka | .................................. | 356/349 |
| 5,537,209 | * | 7/1996 | Lis | ....................................... | 356/349 |

OTHER PUBLICATIONS

Dr. Robert E. Brooks, "Surface Acoustic Wave Signal Processing", Mar. 31, 1984, pp. 3–437–3–442.

* cited by examiner

*Primary Examiner*—Frank G. Font
*Assistant Examiner*—Philip Natividad
(74) *Attorney, Agent, or Firm*—Michael S. Yatsko; Robert W. Keller

(57) ABSTRACT

A dynamic optical micrometer for measuring the position of a moving object is invented. The optical micrometer includes a laser for generating an optical signal, an RF signal generator, an acousto-optic modulator that is responsive to the optical signal and the RF signal and is operative to provide a first light beam and a second light beam that is up shifted in frequency by the RF frequency, an optical interferometer that reflects the first beam off the object and interferometrically combines the reflected light beam and the second light beam into a heterodyned signal, means responsive to the heterodyned signal and operative to produce an electrical signal at the optical beat frequency corresponding to the RF and means responsive to the RF signal and the electrical signal and operative to provide a linear output signal that corresponds to the position of the object. A method for accomplishing the same is also invented.

29 Claims, 2 Drawing Sheets

DYNAMIC OPTICAL MICROMETER

CROSS-REFERENCE TO RELATED APPLICATIONS

This application is related to the following commonly assigned applications: "Heterodyne Wavefront Sensor", having inventors Stephen Brosnan, Donald Heflinger and Lee Heflinger; "A Dynamic Optical Phase State Detector", having inventors Donald Heflinger and Lee Heflinger; "Optical Communication System With Phase Modulation", having inventors Donald Heflinger and Lee Heflinger; "Improved High Average Power Fiber Laser System With High-Speed, Parallel Wavefront Sensor", having inventors Stephen Brosnan, Donald Heflinger, and Lee Heflinger; "Linear Analog Optical Communication System With Two Transmitted Beams And Phase Modulation", having inventors Donald Heflinger and Lee Heflinger; and "Optical Communication System With A Single Polarized, Phase Modulated Transmitted Beam", having inventors Donald Heflinger and Lee Heflinger; filed concurrently with this patent application.

BACKGROUND OF THE INVENTION

1. Field of the Invention

The present invention is generally related to micrometers, and more particularly to a dynamic optical micrometer that linearly detects movement over a distance spanning several optical wavelengths.

2. Description of the Prior Art

Present small motion detectors are limited in the distance over which they can be used and the upper dynamic response that they can follow. Physical micrometers, although not limited in distance, typically do not have a fast dynamic response. Small fast motions typically are measured using conventional optical interferometry. In such conventional optical interferometry a beam of light is transmitted upon a moving object and its reflected light is optically interfered with a portion of the original transmitted light. The resulting interference pattern creates a change in optical intensity that varies sinusoidally as a function of the relative state of phase of the light in the two interfering beams. The magnitude of the varying intensity is correlated to a particular position of the object under test with an accuracy that is within a fraction of the wavelength of the light transmitted. However, this conventional approach only allows for the detection of motion over a maximum distance associated with the variation of a single wavelength of the transmitted light. Further motion repeats the described intensity variation and creates ambiguous results.

What is needed, therefore, is an apparatus and a method for dynamically etecting the motion of an object spanning several wavelengths of light.

In addition, it is desirable to produce an indication that is linearly related to the movement of the object.

SUMMARY OF THE INVENTION

The preceding and other shortcomings of the prior art are addressed and overcome by the present invention which provides generally a dynamic optical micrometer.

Briefly, the optical micrometer detects the motion of an object that moves several microns, spanning several wavelengths of light, with a fast dynamic response. The approach utilizes optical interference in combination with RF modulation and simple digital processing to simultaneously achieve a detection range spanning many wavelengths, an output voltage that is linearly related to position, and a rapid response to changes in position. The invention employs an optical frequency shifter, such as an acousto-optic modulator, that up shifts or down shifts a portion of a beam of transmitted light to a new optical frequency by an amount corresponding to an RF modulation frequency. The transmitted light beam and the shifted light beam are then directed through an interferometer where one of the two beams is reflected off a moving object that is being tested. The two beams are then interferometrically combined and sent to a detector that delivers an electrical signal at the optical beat frequency that corresponds to the frequency of the RF modulation. The phase of the detected RF beat frequency relative to the original RF modulation signal contains the position information of the object under test. The detection of the relative phase of the RF signals is performed by a digital dividing technique that provides a high resolution determination. More particularly, each RF frequency is converted to a digital waveform that is digitally divided by an equal number of powers of two so that the resulting outputs are square waves. The divided signals are applied to an exclusive OR gate that provides a pulse waveform having a duty cycle that reflects the relative phase state of the two RF frequencies. The pulse waveform is filtered to create an average voltage that linearly corresponds to a particular position of the object and is able to follow rapid motions of the object. It does not repeat over a position distance that equals one-half the wavelength of the beam of transmitted light multiplied by the divisor used in the digital division process. Hence, the position distance can be many wavelengths in length.

The foregoing and additional features and advantages of this invention will become apparent from the detailed description and accompanying drawing figures below. In the figures and the written description, numerals indicate the various elements of the invention, like numerals referring to like elements throughout both the drawing figures and the written description.

DETAILED DESCRIPTION OF THE PREFERRED EMBODIMENTS

Figure 1:
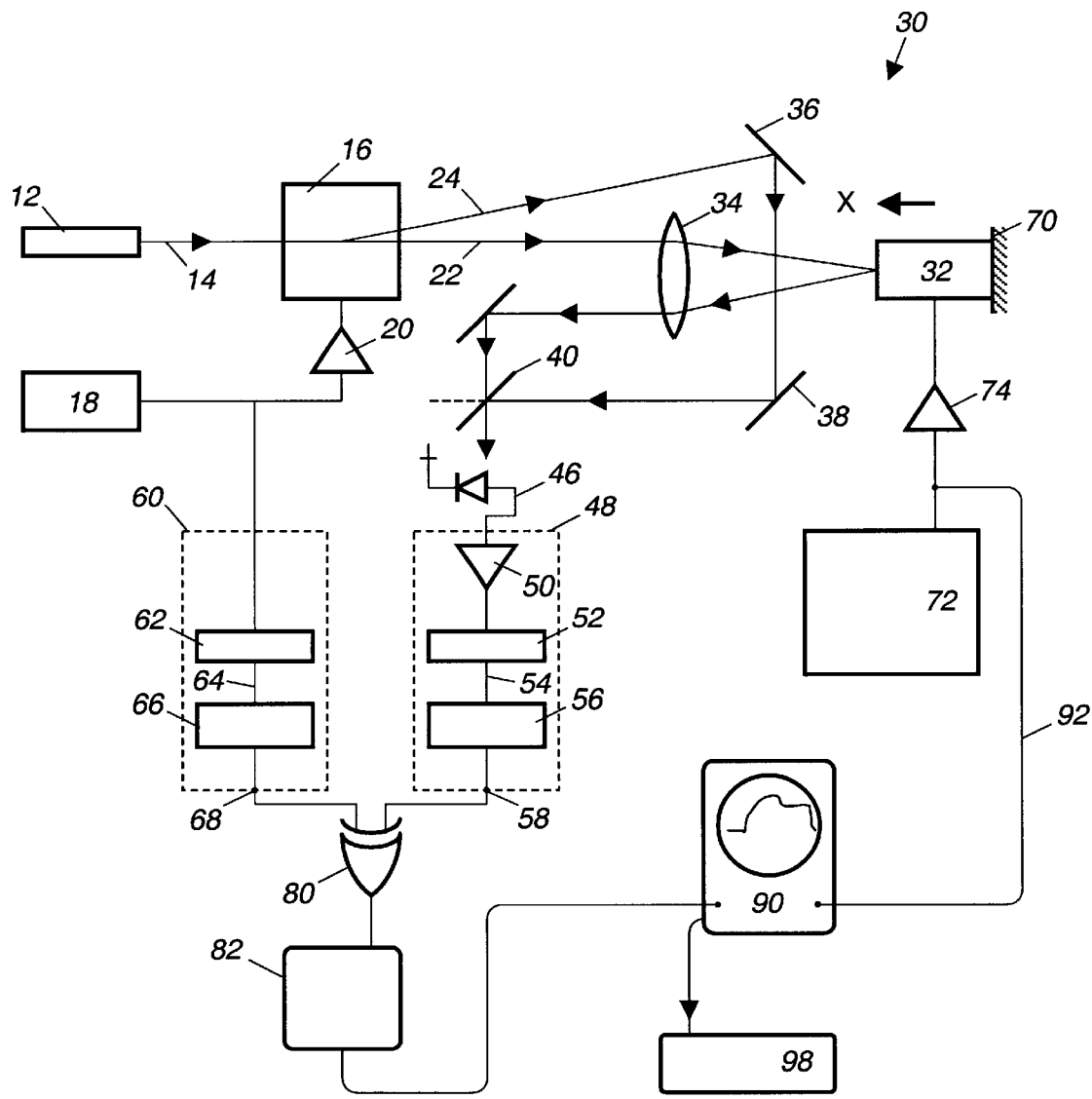
FIG. 1 is a schematic block diagram of the optical micrometer in accordance with the present invention.

As illustrated in the schematic block diagram of FIG. 1, the present invention provides a dynamic optical micrometer, generally designated by the numeral 10. As will be described the optical micrometer 10 generates a linear voltage signal versus position corresponding to the dynamic motion of an object being investigated.

An optical source 12 generates a beam of coherent light or an optical signal at frequency v, which is applied on an optical fiber or a free-space beam 14 to an optical frequency shifter 16. Preferably, the optical source 12 is a helium neon (HeNe) laser that generates a beam of light with a wavelength of 0.63 micrometers, although any coherent source such as a laser diode can also be used. A radio frequency (RF) oscillator 18 generates an RF electrical signal which is applied through an amplifier 20 to the frequency shifter 16. The optical frequency shifter 16 is positioned to receive the coherent source light beam 14 and serves to shift the optical frequency of the beam 14 by an amount corresponding to the RF. In the preferred embodiment, the optical frequency shifter 16 is an acousto-optic modulator, but it can be an optical modulator such as a Mach-Zehnder modulator followed by a narrow pass band optical filter to extract the shifted side band light. The acousto-optic modulator generates an acoustic sound wave in an optically transparent medium by a piezoelectric transducer and the applied RF. This sound wave provides a traveling Bragg grating with a period that corresponds to the RF and diffracts the incident light into an upshifted and/or down shifted light beam. The first order of diffraction is shifted in optical frequency by the RF, the second order of diffraction is shifted in optical frequency by twice the RF and so on.

In the case of an optical frequency shifter 16 that is a Mach-Zehnder modulator which is biased at the minimum light transmission, the delivered light will be directed into just the upper and lower side bands at an optical frequency that is shifted either up or down by the RF. By filtering this light with a narrow pass band optical filter, such as a Fabry Perot filter or a Bragg grating filter, it is possible to extract just the light that is either upshifted or down shifted in frequency.

In the case of an acousto-optic modulator, the RF signal is preferably 40 MHz but it can be as high as 2 GHz. For Mach-Zehnder modulator this RF signal can be as high as 40 GHz. It should be recognized that any fixed RF frequency can be used as long as the RF frequency is higher than the highest frequency component of the dynamic motion to be measured.

The acousto-optic modulator 16 creates an acoustic sound wave that forms a traveling Bragg grating and generates two optical beams 22 and 24 from the beam of light 14. The optical beam 22 is denoted as the reference beam and comprises the unshifted zeroth order beam of transmitted coherent light at frequency v that passes directly through the modulator. The optical beam 24 is a first order Bragg diffracted beam that is up shifted in optical frequency by the RF modulation frequency (v+40 MHz) and is directed at the Bragg diffraction angle. Alternatively, both beams can be shifted. In any event, the beam 22 is separated from the beam 24.

An optical interferometer generally designated by the numeral 30, sends the unshifted beam 22 incident onto an object 32 to be tested. A lens 34 may be used to focus or collimate the beam of light 22 onto the object 32, but this lens is not required. The up shifted beam 24 is routed through reflectors in the form of approximately 45° angled mirrors 36 and 38 in the interferometer 30 to a beam combiner 40, preferably a 50—50 beam splitter that provides equal reflectivity to each beam. The beam combiner 40 combines the light from the upshifted and unshifted beams so that the optical interference between the beams performs a heterodyne of the two optical frequencies which generates the beat frequency representative of the RF modulation frequency. Preferably, the optical path length of the two beams are equal. The beam splitter achieves this optical interference and performs the heterodyne by making the two beams co-linear and superimposed on each other, but other techniques, including fiber optic techniques, also could be used.

It should be recognized that the degree of coherence provided by the particular source used dictates the optical path lengths and the particular beam recombination geometry. Thus sources at various wavelengths, optical paths of different lengths and different mirror geometries may be employed. It is important, however, that the light from the two beams be combined so that the optical interference that occurs between the two beams generates the beat frequency corresponding to the RF modulation frequency.

In addition, it should be recognized that the acousto-optic modulator 16 can generate other beams that can be used besides the unshifted beam 22 and the upshifted beam 24 shown in FIG. 1. In particular, it is possible to use a down-shifted beam (not shown) that can be generated by the acousto-optic modulator in place of the upshifted beam. It is also possible to direct the shifted beam (either up or down) onto the object to be tested and use the unshifted beam as a reference thereby inverting their use. Moreover, it is possible to use the upshifted beam as the beam directed onto the object to be tested and the down-shifted beam as a reference or vise versa. In this case, the signal from the RF generator 18 will need to be doubled before it is used to electronically process the phase state as will be described. These variants sometimes have practical importance but for this description it will be assumed for convenience that the unshifted beam 22 is directed onto the object and the upshifted beam 24 is used as the reference for the interference.

A photodetector 46 responds to the intensity variations in the interference of the beams by optically heterodyning the two optical frequencies to create the RF beat frequency signal. In the preferred embodiment, this photodetector is a PIN photodiode; however, other types of photodetectors such as avalanche photodiodes or photomultiplier tubes can be used. This is applied to path 48 as shown in dashed lines. The phase of the detected RF beat frequency relative to the original RF driver signal from RF generator 18 corresponds directly to the particular position of the object 32. An amplifier 50 amplifies the detected RF beat frequency signal to a sinusiod at a preselected amplitude that can trigger a digitizing circuit. More particularly, a Schmidt trigger 52 converts the sinusoid into a digital waveform signal at 54 which corresponds to the RF beat frequency modulation at its output 54. However, other components that are functionally equivalent to a Schmidt trigger and that yield a signal that can be sent to a digital divider also can be used.

The signal at 54 is then provided to a digital divider 56 that creates at its output 58 a square wave that is lower in frequency by the particular integer divisor used in the divide chain. Simple digital flip-flop dividers make it convenient to divide by a particular power of two. Mathematically, the square wave frequency is:

$$f/2^m, \text{ where } m=1, 2, 3, 4 \ldots$$

and f is the RF modulation frequency. The power of two used for the division depends on the desired resolution with which the motion is to be studied. It will be apparent that division by integers, denoted as N, other than powers of two also will result in similar performance provided the output of the divider chain is a square wave and that both chains 48 and 60 divide identically. Division by powers of two is the preferred embodiment because of its simplicity and ease of implementation.

Similarly, a portion of the RF modulating signal developed by the RF oscillator 18 is applied as a reference signal to a path 60 shown in dashed lines, and more particularly to the input of a Schmidt trigger 62 that serves to convert the sinusoid and develop a digital waveform at the RF modulating frequency at its output 64. Digital divider 66 creates on its output 68 a square wave that is lower in frequency by the same power of two used in digital divider 56. In the preferred embodiment, digital dividers 56 and 66 are FAST TTL flip-flops manufactured by Fairchild Corporation and designated as Model 74F74. The two resulting square waves 58 and 68 have an offset in their relative phase dependent on the original offset in phase that was set by the position of the object 32 in the optical interferometer 30.

The object's dynamic motion that is measurable with this invention can stem from uncontrolled sources, such as natural vibration, or this motion can be intentionally induced by a mechanical driver. Periodic motions or motion due to impulses or other waveforms can be studied in high resolution detail by this invention. To achieve change in position using a mechanical driver, i.e. a displacement x or movement of the object 32 from its initial position against a reference surface 70, a waveform generator 72 applies a drive signal through drive amplifier 74 to the object 32. This causes the object to move to a new position depending on the amplitude and shape of the waveform that is generated.

Figure 2:
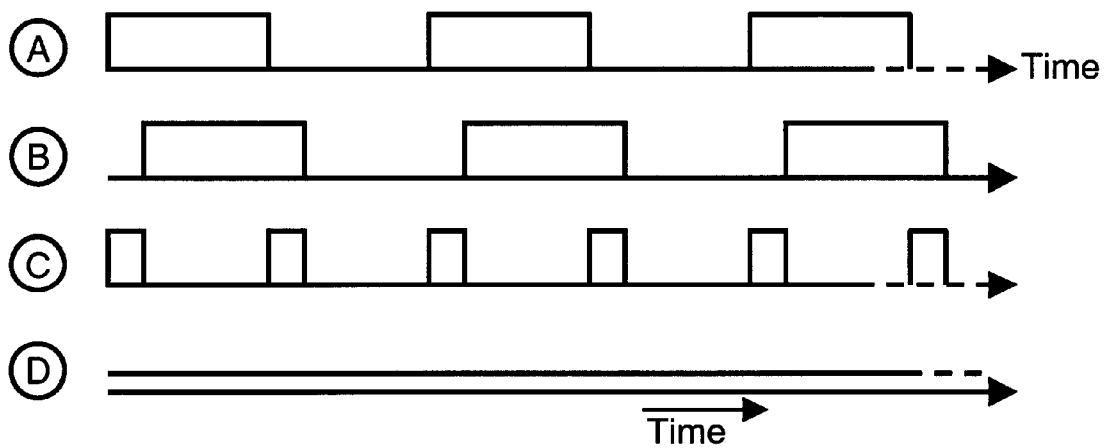
FIG. 2 is a timing diagram illustrating the waveforms developed at several elements in the optical micrometer illustrated in FIG. 1, with the object at an initial position.

With reference now to FIG. 2 timing diagrams are shown for the signals appearing at the outputs 68 and 58 as they are processed through successive stages of the optical micrometer. More particularly, the offset is shown by the displacement in the transitions in the timing diagram between the signal 68 at FIG. 2A, which is the divided signal applied by the RF oscillator, and the signal 58 at FIG. 2B, which is the divided square wave signal from the optically detected RF beat frequency. As illustrated one period of the square waves shown in FIGS. 2A and 2B is $2^m/f$. When these square wave signals are combined by an exclusive OR gate 80 it produces a pulse wave form shown by the signal at FIG. 2C, with a duty cycle dependent on the displacement of the object. This duty cycle is then sent through a low pass filter 82 that develops a DC voltage on its output as shown in FIG. 2D, having a magnitude that is dependent on the duty cycle. Preferably, the low pass filter 82 is a conventional resistor capacitor integrator circuit and has a passband that is less than 1 MHz.

Figure 3:
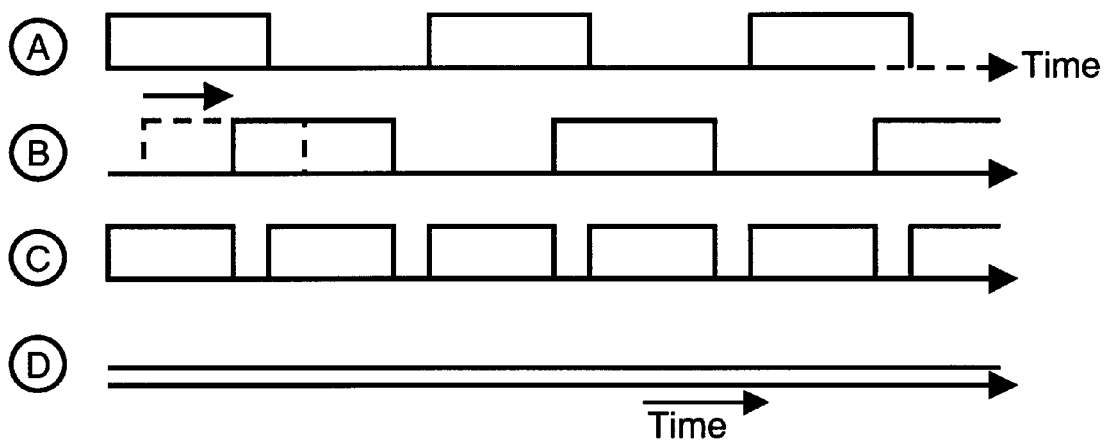
FIG. 3 is a timing diagram illustrating the waveforms developed at several elements in the optical micrometer after the object has been moved to another position.
Figure 4:
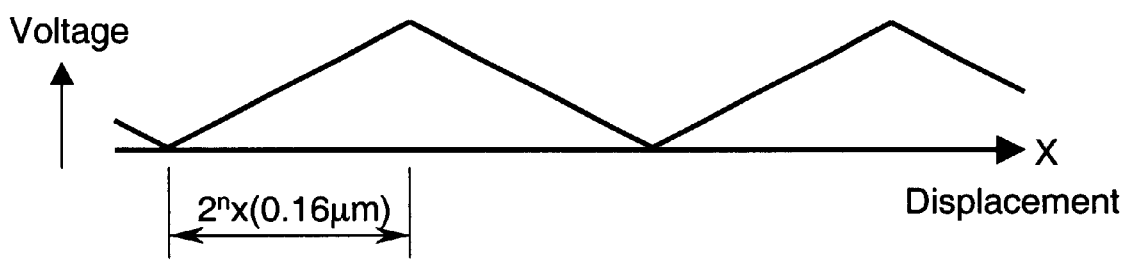
FIG. 4 is a plot of voltage versus position representing the output signal produced by object movement.

As shown in FIG. 3, when the object is driven under test and moves to a new position a new interference pattern is developed by the optical interferometer. This results in the square wave signal at FIG. 3B being developed by the digital divider 56. As shown its signal is displaced relative to the signal at FIG. 3A (and also to the signal shown in FIG. 2B as illustrated by the dashed lines) and corresponds to the phase displacement. This leads to a new pulse wave form at the output of the exclusive OR gate 80 with an increased duty cycle as shown by the signal at FIG. 3C. This increased duty cycle creates a larger DC voltage at the output of the low pass filter 82 as shown in FIG. 3D that has a linear dependence on the actual position of the object. Thus, if the object is made to arbitrarily move back and forth, its resulting wave form of voltage versus displacement follows a repetitive linear triangular wave form that spans several wavelengths as shown in FIG. 4. Note that in FIG. 4 the independent variable is displacement (not time as shown in FIGS. 2 and 3). In normal use the division ratio will be chosen so that the motion under investigation all takes place on a single slope or segment of the response curve of FIG. 4, thus giving a linear response without passing over the peaks or valleys of the triangle wave, thereby avoiding ambiguity. From the wavelength of light used in the interferometer, the position or distance traveled can be directly read from the magnitude of the DC voltage. For fast dynamic measurements of the object's motion, this voltage can be displayed on the oscilloscope 90. By triggering the sweep of the oscilloscope 90 with a signal on conductor 92 derived from the waveform generator 72 a high resolution display of the motion of the object 32 can be observed. The oscilloscope can be connected to display x, y or dual beam representations versus time. A computer 98 serves to record or print out the display on the oscilloscope.

The dynamic optical micrometer is not constrained to using any particular wavelength of light or any particular RF modulation frequency. However, to achieve high resolution measurements of the motion, the RF modulation frequency should be chosen to be high enough so as to ensure that the divided down square wave frequency used for the phase comparison is still much greater than the dynamic motion response of interest. Also, the object can be moved by natural or other forces, such as, for example, building vibration, or a rotating motor shaft.

It should also be noted that the present invention provides a linear voltage signal that represents the optical state of phase of the light as it returns from the object being tested. Thus, the invention is directly applicable to being a dynamic optical phase state detector of light that interacts with a photonic component or process that changes the phase. This invention can be used to actively track the phase state of light delivered by a photonic component. The light signal delivered by the photonic component has a changed state of phase that is directly detected in a manner, as previously described, so as to generate a voltage signal that linearly corresponds to the state of phase of the optical signal. Use of the invention in this application would allow phase changes stemming from both controlled and uncontrolled conditions, such as those induced by temperature, to be actively tracked by the voltage signal delivered.

Obviously, many modifications and variations of the present invention are possible in view of the above teachings. Thus, it is to be understood that, within the scope of the appended claims, the invention may be practiced otherwise than as specifically described above.

What is claimed is:

1. An optical micrometer using an optical signal and a radio frequency (RF) signal for measuring the position of an object comprising:

optical frequency shifting means responsive to said optical signal and said RF signal and operative to provide a first light beam and a second light beam one of which is shifted in frequency by an amount corresponding to the RF;

optical interferometer means responsive to said first and said second light beams and operative to reflect said first beam off the object and interferometrically combine said reflected first light beam and said second light beam into a heterodyne signal;

means responsive to said heterodyne signal and operative to produce an electrical signal at the optical beat frequency corresponding to the RF; and means responsive to said RF signal and said electrical signal and operative to provide a single voltage output signal that has a linear correspondence to the position of the object.

2. The optical micrometer as set forth in claim 1, wherein said output signal has a magnitude that varies linearly relative to the position of the object.

3. The optical micrometer as set forth in claim 1, wherein said means responsive to said RF signal and said electrical signal includes a first digital divider and a second digital divider, said digital dividers serving to divide the RF frequency of said RF signal and said electrical signal, and circuit means responsive to the divided RF signal and the divided electrical signal and operative to produce said output signal.

4. The optical micrometer as set forth in claim 3, wherein said digital dividers serve to divide the RF frequency of said RF signal and said electrical signal by $2^m$, where m is any integer.

5. The optical micrometer as set forth in claim 3, wherein said digital dividers serve to divide the RF frequency of said RF signal and said electrical signal by N where N is any integer.

6. The optical micrometer as set forth in claim 3, wherein said circuit means includes an exclusive OR gate for providing a pulse waveform having a duty cycle that reflects the relative phase between the divided RF signal and the divided electrical signal and a filter circuit for developing said output signal.

7. The optical micrometer as set forth in claim 1, and further comprising means for moving the object.

8. The optical micrometer as set forth in claim 6, and further comprising means responsive to said means for moving the object and said output signal and operative to display the position of the object.

9. The optical micrometer as set forth in claim 8, and further comprising means for recording the display of the position of the object.

10. The optical micrometer as set forth in claim 1, wherein said means responsive to said RF signal and said electrical signal includes a first means for converting said RF signal into a first digital waveform and for applying said first digital waveform to said first digital divider to form a first divided square wave and a second means for converting said electrical signal into a digital waveform wave and for applying said digital waveform wave to said second digital divider to form a second divided square wave.

11. The optical micrometer as set forth in claim 1, wherein said means for generating an optical signal is a helium neon laser.

12. The optical micrometer as set forth in claim 1, wherein said means for generating an optical signal is a diode laser.

13. The optical micrometer as set forth in claim 3, wherein said output signal has an increasing magnitude over the position of the object up to a displacement equal to the product of one-half the wavelength of the optical signal and the divisor of the said digital dividers.

14. The optical micrometer as set forth in claim 1, and further comprising means for generating said optical signal.

15. The optical micrometer as set forth in claim 1, and further comprising means for generating said RF signal.

16. The optical micrometer as set forth in claim 14, and further comprising means for generating said RF signal.

17. A method for measuring the position of an object comprising the steps of:

modulating an optical signal with a radio frequency (RF) signal so as to generate a first light beam and a second light beam, one of which is shifted in frequency by an amount corresponding to the RF;

reflecting the first light beam off a moving object;

interferometrically combining the reflected first light beam and the second light beam so as to produce a heterodyned optical signal at the RF beat frequency that corresponds to the position of the moving object;

converting the heterodyned optical signal into an electrical signal at the optical beat frequency and having a phase corresponding to the object position;

dividing the frequency of the RF signal and the electrical signal and generating a pulse waveform from the divided RF signal and the divided electrical signal, the pulse waveform having a duty cycle that reflects the relative phase state of the divided signals; and filtering the pulse waveform to produce a single voltage output signal having a linear correspondence to the position of the object.

18. The method for measuring the position of an object as set forth in claim 17, wherein the output signal varies linearly with the position of the object.

19. The method for measuring the position of an object as set forth in claim 17, wherein the step of dividing the frequency comprises the steps of dividing the frequency of the RF signal by N, and dividing the frequency of the electrical signal by the same N.

20. The method for measuring the position of an object as set forth in claim 17, wherein the step of dividing the frequency comprises the steps of dividing the frequency of the RF signal by $2^m$, and dividing the frequency of the electrical signal by the same $2^m$.

21. The method for measuring the position of an object as set forth in claim 17, wherein the step of generating a pulse waveform comprises exclusive ORing the divided RF signal and the divided electrical signal to produce the pulse waveform.

22. The method for measuring the position of an object as set forth in claim 17, and further comprising the step of moving the object so as to change its position.

23. The method for measuring the position of an object as set forth in claim 22, wherein the optical signal has a characteristic wavelength and the output signal increases linearly when the object is moved from its initial position to a distance equal to N times one-half the wavelength of the optical signal.

24. The method for measuring the position of an object as set forth in claim 17, and further comprising the step of displaying the position of the object as it moves.

25. The method for measuring the position of an object as set forth in claim 24, and further comprising the step of recording the display.

26. The method for measuring the position of an object as set forth in claim 17, wherein the general optical signal is in the form of coherent light.

27. The method for measuring the position of an object as set forth in claim 17, and further comprising the step of generating said optical signal.

28. The method for measuring the position of an object as set forth in claim 27, and further comprising the step of generating said RF signal.

29. The method for measuring the position of an object as set forth in claim 17, and further comprising the step of generating said RF signal.

* * * * *